United States Patent [19]

Acree

[11] Patent Number: 5,087,469
[45] Date of Patent: Feb. 11, 1992

[54] COFFEE FLAVOR ENHANCERS

[75] Inventor: Terry E. Acree, Geneva, N.Y.

[73] Assignee: Cornell Research Foundation, Inc., Ithaca, N.Y.

[21] Appl. No.: 529,000

[22] Filed: May 24, 1990

[51] Int. Cl.$^5$ ................................................ A23F 5/48
[52] U.S. Cl. ...................................... 426/544; 426/546; 426/594; 426/650; 426/651; 426/386
[58] Field of Search ............... 426/386, 594, 650, 651, 426/544, 546

[56] References Cited

U.S. PATENT DOCUMENTS

| | | | |
|---|---|---|---|
| 1,292,458 | 1/1919 | Hamor et al. | 426/386 |
| 2,773,774 | 12/1956 | McCarthy et al. | 426/387 |
| 3,418,134 | 12/1968 | Rooker | 426/386 |
| 3,535,118 | 10/1970 | Klein et al. | 426/386 |
| 4,048,863 | 3/1978 | Eriksson et al. | 356/336 |
| 4,692,210 | 9/1987 | Forrester | 162/263 |
| 4,837,446 | 6/1989 | Renard et al. | 250/461.1 |
| 4,919,962 | 4/1990 | Arora et al. | 426/594 |
| 4,986,660 | 1/1991 | Corbett | 356/342 |

OTHER PUBLICATIONS

Kirk-Othmer, Encyclopedia of Chemical Technology, 3rd Ed., 1978, vol. I, pp. 531-547.

Primary Examiner—Joseph Golian
Attorney, Agent, or Firm—Jones, Tullar & Cooper

[57] ABSTRACT

Coffee flavor enhancers were obtained by passing an inert gas over ground fresh roasted coffee beans heated at a temperature of from about 150° F. to about 185° F. and by selective capture of the desirable flavor enhancers entrained in the gas stream. After capture on solid adsorbents including $C_{18}$-silica, the flavor enhancers were eluted using food grade acceptable solvents or solvent/water mixtures and combined with coffee concentrates and hot water to give a reconstituted instant coffee having the aroma and flavor of freshly ground and/or freshly brewed coffee. An apparatus for blending such reconstituted coffee is described.

7 Claims, 2 Drawing Sheets

COFFEE FLAVOR ENHANCERS

The present invention relates to coffee flavor enhancers, their isolation from ground coffee, and their use in instant coffee beverage dispensers.

BACKGROUND OF THE INVENTION

The unique and distinctive flavor of fresh roasted and brewed coffee is due primarily to chemicals formed during roasting W. Baltes et al, *J. Agric. Food Chem.* 35(3): 340-6 (1987); W. Baletes et al, *Z. Lebensm. Unters. Forsch.* 184(3): 179-86 (1987); W. Baltes et al, *Z. Lebensm. Unters. Forsch.* 184(6): 478-84 (1987); W. Baltes et al, *Z. Lebensm. Unters. Forsch.* 185(1): 5-9 (1987); W. Baltes et al, *Z. Lebensm. Unters. Forsch.* 184(6): 485-93 (1987); R. J. Clarke, *Coffee, Vol.* 2 Technology. Clarke and Macrae ed. 1987 Dept. Food Science, University of Reading. Reading; I. Flament and C. Chevallier. "Analysis of Volatile Constituents of Coffee Aroma." Chem. Ind. (London).: 1988; R. Tressl, "Formation of Components in Roasted Coffee." Thermal Generation of Aromas. Parliment ed. 1989 American Chemical Society. Washington, D.C. As green coffee beans are roasted, amino acids, sugars, lipids and lignin in the bean degrade and react with each other to form thousands of mostly odorless compounds. Among these are a small subset of odor-active compounds. The chemical structures of some of these odors are known but most have yet to be described or at least the relative odor importance of the known components have yet to be demonstrated. What is generally accepted is that the aroma of coffee immediately after roasting is at its most desirable state. Within a few days the amount of desirable aroma has decreased noticeably and many undesirable odors have become detectable. The chemistry of this flavor change may involve free radical reactions similar to those that formed the flavor during roasting.

The odor-active chemicals in coffee are formed under reductive conditions and are therefore susceptible to oxidation. Because oxidized coffee aroma is generally undesirable, oxidation is the most obvious reaction to inhibit; however, oxygen is not the only agent involved in the degradation of fresh roasted coffee aroma. The inevitable decay of nitrogen packed coffee is a perfect example of this chemistry Thus, there are two problems to be solved in order to prepare a stable coffee essence. The desirable aromas must be trapped and stabilized and at the same time the undesirable odors must be either eliminated or their formation prevented.

Instant coffee beverage dispensers have been known for some time and are useful in vending machines, restaurants and institutions where it is less than desirable to make freshly brewed coffee. However, not withstanding the widespread use of such coffee beverage machines, the beverage product dispensed using a liquid coffee concentrate suffers from the disadvantage that flavor and aroma of such beverage is quite different from the flavor and aroma associated with the flavor and aroma of freshly brewed or freshly ground coffee. The present invention relates to preparing and isolating these gaseous flavors and aromas and their use in making improved beverages and foods therefrom.

BRIEF DESCRIPTION OF THE INVENTION

One object of the present invention relates to a process for treating a natural product to produce, isolate and stabilize volatile flavor and fragrance essences including aroma enhancers and/or flavor enhancers, hereinafter referred to as "flavor enhancers".

A further object of the present invention relates to a stabilized coffee flavor enhancer composition comprising 1) a coffee flavor enhancer prepared and isolated from freshly roasted or freshly brewed coffee; and 2) an adsorbent adapted to selectively trap, contain and stabilize the said flavor enhancer.

A yet further object to the invention relates to a composition comprising the flavor enhancer and a carrier, including both liquid and solid carriers, wherein such composition can be stored under ambient conditions without detriment to the flavor enhancer and from which the flavor enhancer can be isolated and used as required, as for example to produce reconstituted coffee having the characteristics of freshly brewed or freshly ground coffee.

A yet further object of the present invention relates to the use of said flavor enhancers to produce foods and beverages, such as reconstituted beverages, having the aroma and flavor associated with the food in its natural state and to improved apparatus for dispensing such reconstituted beverages.

DETAILED DESCRIPTION OF THE INVENTION

Figure 1:
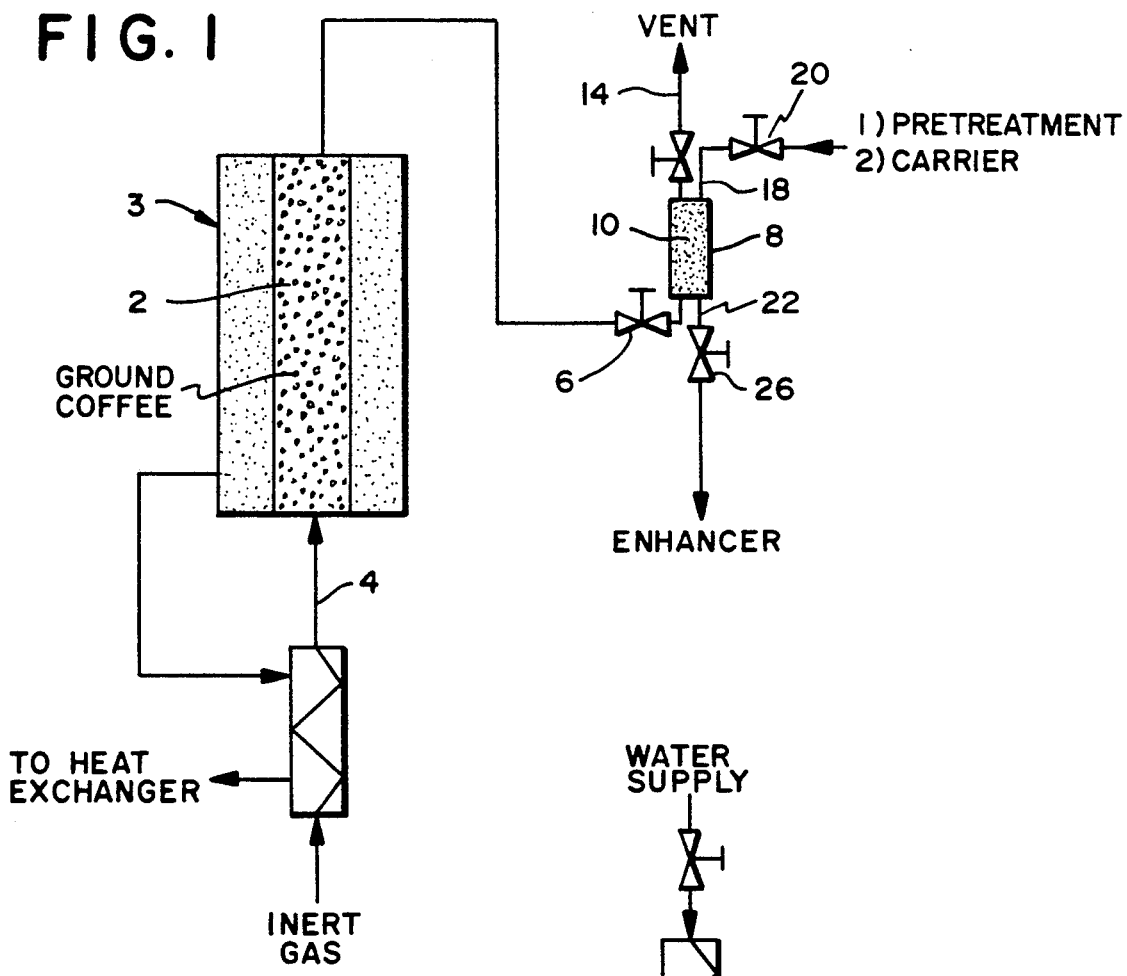
FIG. 1 shows a schematic drawing of one mode of an apparatus for passing an inert gas over heated ground coffee thereby entraining volatile coffee components in the gas, and separating the desired coffee flavor enhancers from the less desirable components.

The invention relates to flavor and essence components derived from naturally occurring sources including fruits, vegetables, plants, foods, and their use as additives in flavoring foods, beverages and other items of commerce. As used herein, these components are hereinafter referred to and designated as "flavor enhancer" defined broadly as the desirable volatile, aroma, flavor and essence components inherent or derived from the natural product which can be isolated and used for various sensory-pleasant purposes.

Although the invention is exemplified with respect to coffee, it will be recognized that the process can be adapted to an essence or flavor whether originating from natural sources or synthetically prepared or compounded.

The flavor of fresh roasted and brewed coffee is due primarily to chemicals formed during roasting.

The present invention relates to a process for preparing a coffee flavor enhancer having the odor and/or taste characteristics of freshly ground and/or freshly brewed coffee which comprises:

1) passing an inert gas through freshly ground or freshly roasted coffee at a temperature, preferably from about 150° F. to about 185° F., sufficient to entrain the coffee flavor enhancer produced at said temperature;

2) selectively removing and stabilizing the said flavor enhancer from the inert gas stream by adsorption on an adsorbent adapted to selectively adsorb and stabilize the desired flavor enhancer and to allow less desirable odors and aromas in the inert gas stream to pass without being adsorbed.

Another aspect of the invention is a composition of matter comprising a coffee flavor enhancer having the odor and taste characteristics of freshly ground and/or freshly brewed coffee.

A further aspect of the invention relates to a stabilized coffee flavor enhancer composition comprising:
1) coffee flavor enhancers prepared from freshly roasted or freshly brewed coffee; and
2) an adsorbent adapted to selectively trap and stabilize the said flavor enhancers.

It is contemplated that the flavor enhancers can be stored in a solid or liquid carrier or microencapsulated, advantageously containing a stabilizer. Such composition comprising the flavor enhancer and carrier should be stable under ambient conditions without detriment to the flavor enhancer and should allow the flavor enhancer to be isolated and used, as for example, to produce reconstituted coffee having the characteristics of freshly brewed coffee.

The flavor enhancer may be adsorbed and stabilized on a variety of solid adsorbents. These include for example charcoal, activated carbon, silica, silica gels, alumina and other commonly used adsorbents capable of selectively adsorbing the desirable volatile enhancers from the inert gas stream passing over or through the heated ground coffee and from which the flavor enhancer can be readily isolated or extracted with water or food grade solvent or mixtures thereof. Particularly useful adsorbents for this purpose include polymers having a siloxane (Si-O-Si) structure in at least a portion of the polymer backbone and having $C_{12}$ to $C_{24}$ hydrophobic alkyl or alkenyl hydrocarbyl appendages, preferably $C_{18}$-appendages or $C_{12}$ to $C_{24}$ hydrophobic alkoxy appendages pendant to said backbone. Silica cartridges and Octadecylsilane bonded phase packings are useful adsorbents. A $C_{18}$-silica adsorbent such as Sep-Pak $C_{18}$ available from Waters Associates is a preferred solid adsorbent.

Alternatively the flavor enhancer can be isolated and used as a solution of the enhancer in a food grade acceptable solvent or a solvent/water mixture. In either case, it is preferred to stabilize the flavor enhancer by adding a stabilizer or antioxidant. The antioxidant may be provided in many ways known to the art. A preferred method is to pretreat the adsorbent with an antioxidant. When it is contemplated that the enhancer will be used as a solution in a solvent or solvent/water mixture it is contemplated that the enhancer and a stabilizing amount of antioxidant can be eluted from the adsorbent by treating the adsorbent with a solvent. In such case, the antioxidant or stabilizer can be added to the solvent prior to contacting the adsorbent, thereby regenerating the adsorbent for subsequent use and replenishing the antioxidant on the adsorbent. By careful adjustment the amount of antioxidant in the solvent, the amount of antioxidant both on the adsorbent and in the solution of the flavor enhancer can be maintained at an acceptable level.

The following steps illustrate a typical process for preparing desirable coffee fragrances and essences:

1. Green coffee beans are roasted under conventional roasting conditions and then cooled in a stream of inert gas such as carbon dioxide or nitrogen. These beans can be either stored cold until they are ground or ground immediately.

2. During grinding the beans are swept with an inert gas (IG) and/or are swept with IG preferably before they are extracted with water. Cold beans or ground coffee must be preheated in order to produce volatile flavor enhancer during essence extraction.

3. The inert gas streams flowing from the roasters, grinders, and extractors pass through adsorbents including modified silicas such as $C_{18}$, aminopropyl, polyol, etc., modified silica beads, flakes, diatomaceous earths, glasses etc. The absorbent can be treated with antioxidants and swept with inert gases prior to essence absorption.

4. After absorption of the flavor enhancer, the absorbent bed is preferably cooled with inert gas and then eluted with an appropriate carrier much as, ethanol, polyethyleneglycol, etc., containing food grade stabilizers such as ascorbic, phenolic, unsaturated substances producing a stable coffee flavor enhancer.

5. The coffee flavor enhancer can be either added to the coffee water extract before distribution or kept separate and combined with the other coffee components at the point of consumption. This requires a multicomponent reconstitution system.

6. At the time of reconstitution the coffee product mix can be selected by the consumer to his/her personal taste and at a cost determined according to the selection. Possible selections include low caffeine-high flavor enhancer-high extract concentrate, high caffeine-high flavor enhancer-low extract concentrate with various degrees of sugar and creamers.

7. It is not necessary that the coffee components come from the same coffee beans. The beans can be chosen to optimize functional demand.

One type of flavor enhancer extractor used for collecting the coffee aroma enhancer is shown diagrammatically in FIG. 1. Freshly ground coffee is placed in column 2 equipped with a column heating means 3, inert gas inlet tube 4, which allows inert gas to enter the bottom of the column, pass through the coffee and then exit at lock valve 6. The inert gas carrying entrained flavor enhancers exits through an adsorption column 8, packed with an adsorbent 10, such as, for example, Sep-Pak $C_{18}$ adapted to entrap the desirable (good) aroma enhancer fraction and allow the undesirable fraction entrained in the inert gas streams to pass to atmosphere. Column 2 is maintained at a specified temperature of from about 150° F. to about 185° F. by temperature exchange fluid 3 or other heating means such as by immersion in bath (17 liter capacity $-305$ mm$\times$305 mm Jar-VWR 36349-151) using a "Vycor" 1000 watt VWR 33900-131 heater, while agitating with a "Lightning" Mode F mixer. Bed temperature was measured with an Omega HH82 w/k digital thermometer. Gas input through flow controller and flowmeter was maintained at a flow rate of from about 60 ml/min to about 120 ml/min.

Preferably, the flavor enhancer fraction is trapped in a $C_{18}$ Waters Sep-Pak column loaded with 1% BHA antioxidant stabilizer. Other food grade antioxidants can be used in place of the BHA.

Adsorbent column 10 is preferably conditioned prior to adsorption with antioxidant/stabilizer treatments via port 18 and valve 20. After entrapment of flavor enhancer, eluent liquid was added via port 18 and stabilized flavor enhancer concentrate was removed via port 22. Although the depicted scheme is a batch operation, one skilled in the art will recognize that the apparatus can be made continuous with proper adaptation. The adsorbent such as Sep-Pak columns can be regenerated with antioxidant simultaneously with elution of the aroma enhancer using fresh ethanol/antioxidant solution.

The flavor enhancer was eluted from the column using ethanol and was isolated as an ethanol or ethanol/water concentrate. The concentrate was used as an additive in the sensory tests.

Freshly ground coffee (1.25 grams) was charged to the aroma generator apparatus and purged for 5 minutes at room temperatures (23°–24° C.) using a nitrogen flow rate of 60 ml/minute. The aroma generator was then immersed in the water bath maintained at the specified temperature for 30 minutes using 3 Sep-Pak $C_{18}$ columns to collect the flavor enhancer components. The flavor enhancer was separated from the less desirable odors entrained in the inert gas stream by selective adsorption on the Sep-Pak $C_{18}$ adsorbent.

As used herein, the term "flavor enhancer or aroma enhancer" means one or more desirable volatile flavor components produced by the indicated methods and compositions which include appropriate food grade stabilizers to fortify such flavor enhancers. Most enhancers will be a mixture of many flavor components some of which can be characterized and some which have not been characterized. For example, not all of the components of the coffee flavor enhancers have been characterized. Useful methods of characterization include gas chromatography, odor analysis, or combinations thereof.

The undesired fraction separated from the desired flavor enhancer fraction is described as a gas (natural) odor at times having a strong sulfur gas odor and/or a cardboard-like odor.

In the selective adsorption of the desired enhancer from the inert gas phase carrier, an effective amount of antioxidant is added to stabilize the flavor enhancer. The enhancer stabilizer can be added directly to the aroma enhancer solution or it can be added directly to the adsorption column substrate prior to entrapment of the enhancer. A preferred method is to add the stabilizer directly to the column, usually as an ethanol solution and to use an ethanol solution of stabilizer to sequentially elute the column to remove enhancer thus maintaining a antioxidant treated column for subsequent cycling of columns in a continuous or semicontinuous operation.

Various food grade antioxidants are useful to treat the adsorbent column prior to the entrapment of flavor enhancer from the inert gas phase. These include for example BHA (butylated hydroxy anisole); BHT (butylated hydroxytoluene (2,6-Bis(1,1-dimethylethyl)-4-methylphenol) and the like. BHA and BHT are preferred antioxidants for the purpose of this invention especially when $C_{18}$ silica is used to trap the flavor enhancer. Using the following stabilizer analysis procedure it was determined that 12 mg of BHA was retained per gram of adsorbent. A useful range of antioxidant in an aqueous or solvent system carrier, which will depend in part on the system, is from about 0.01 to about 1.0 percent of carrier.

Waters "Sep-Pak" $C_{18}$ cartridges (#51910-Waters Associates) treated with solutions of 2-tert-butyl-4-methoxyphenol (BHA) were used as "aroma collectors". A measure of the BHA remaining after treatment was measured using a Rainin, 10×250 cm, $C_{18}$ column.

A K-value of 2.32 for BHA was obtained using 77/23 Methanol/Water solvent mixture at 3 ml/min flow rate.

1. 3 ml of a 1% solution of BHA in 95% ethyl alcohol (ETOH) loaded onto the Sep-Pak with a syringe.
2. The BHA solution then pushed out of the Sep-Pak with the empty syringe.
3. The Sep-Pak then dried with a 60 ml/min nitrogen stream for 17 hours.
4. The dried Sep-Pak eluted with 3 ml 95% ETOH.

Figure 2:
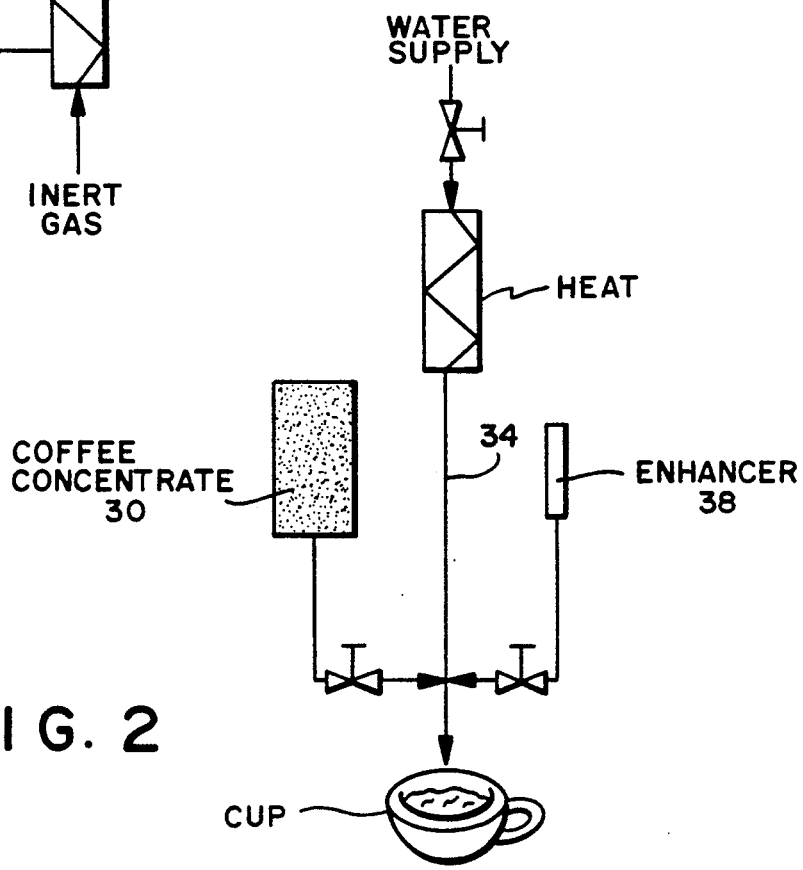
FIG. 2 is a schematic drawing of an automatic coffee dispenser wherein coffee concentrate, heated water and coffee flavor enhancers are combined to produce coffee having desirable flavor and aroma.

A further aspect of the invention relates to an apparatus for dispensing a beverage comprising a beverage concentrate combined with one or more flavor enhancers derived and isolated from the natural product. An improved dispensing apparatus for producing and dispensing a reconstituted instant coffee having the aroma and flavor of freshly ground and/or freshly brewed coffee is shown diagrammatically in FIG. 2. Such apparatus comprises a reservoir of liquid coffee extract; a source of hot water; a reservoir of coffee aroma enhancer 30; and a means for combining and dispensing the liquid coffee concentrate, hot water 34 and the coffee flavor enhancer 38. It will be recognized that one skilled in the art will recognize that a variety of choices can be included in such dispensers such as for including or not including enhancer, and other ingredients including sugar, caffeine and cream as is recognized in present day vending machine art.

Although the invention is exemplified with respect to coffee, the apparatus and process can be readily adapted to a variety of flavor enhancers derived or isolated from naturally occurring products including for example fruits, vegetables, plants, and from various form of bioreactors producing specific useful products. Examples of such useful essences include apple, grape, orange, meat, dairy, chocolate and the like.

The following examples are meant to generally illustrate the invention and should not be construed as limiting the scope of the invention. The isolated flavors and essences can be formulated in an almost endless list of products including for example spices, condiments, medicinals, natural and fermented beverages, packaged foods, cosmetics, toiletries, perfumes, dental preparations, colognes, body lotions, powders, deodorants, soaps, detergents, paper products including napkins, wipes, toilet tissue, clothing, handkerchiefs, socks and the like. Unless otherwise indicated temperatures are given in degrees centigrade.

EXAMPLE 1

25 g ground coffee beans were placed in the aroma generator and purged with 60 ml/min $N_2$ for 2 minutes at room temperature. Then the coffee reservoir was lowered into a water bath held at 55° C. and fitted with 2 Sep-Pak (C-$_{18}$) in series marked "B & T". The aroma stream passed through "B" first and then through the second "T". The generator was run for 20 minutes at 200 ml/min. At end of the run, two more Sep-Paks were connected to the aroma generator and run for 20 minutes under the same conditions as above. All Sep-Paks were eluted with 3 ml ethanol and the enhancer solution was stored in brown vials at room temperature. The odor of each sample was assessed by sniffing perfume blotters (filter paper strips) dipping in the enhancer solutions with the following results.

| CODE | ODOR | DESCRIPTION | ODOR QUALITY |
|------|------|-------------|--------------|
| V007 | B | First 20 min first trap | Strong Fresh Coffee |

| CODE | ODOR | DESCRIPTION | ODOR QUALITY |
|------|------|-------------|--------------|
| V008 | T | First 20 min second trap | Natural Gas |
| V009 | B | Second 20 min first trap | Weak Coffee Cardboard |
| V010 | T | Second 20 min second trap | Natural Gas |

Clearly most of the important aroma is caught in the first trap. Furthermore, aroma is still being generated after 20 minutes although most of the aroma was generated during the first 20 minutes. Grinding the coffee during purging would greatly accelerate this process and give higher yields.

EXAMPLE 2

1. Water bath temperature at 80° C.
2. N2 flow at 100 ml/min.
3. Grind 75 g coffee beans in 40 seconds (Krups Type 203).
4. Purge for 2 minutes at room temperature.
5. Place generator in 80° C. water bath.
6. Use recycled Sep-Paks prewetted with 5 ml EtOH and washed with 5 ml water immediately before placing Sep-Pak on generator.
7. Collect 20 minutes.
8. Elute with 1 ml EtOH.
9. Repeat two (2) times, save in same bottle.

Taste tests using 1 ml of enhancer in 200 ml instant coffee at 65° C., shown in Table 1, demonstrates that treatment with the enhancer statistically improves the aroma of instant coffee.

EXAMPLE 3

Sensory test—Coffee Taste Evaluation Center

Coffee was prepared from concentrate (Lykes Pasco Family Choice, 8811-189) with and without flavor enhancer as prepared in Example 2 in cups of 200 ml capacity. Water at a temperature of 75° C. was added from a thermos. After addition of concentrate (and enhancer) the final temperature was about 65° C. The control sample contained coffee concentrate, hot water and carrier liquid identical to that used in the enhanced sample but without flavor enhancer. Each cup was stirred with a spoon to mix contents.

The resulting cup of coffee was stirred, separated into 3 parts and presented to the taseers in cups for aroma appraisal.

Two people were chosen who drink coffee and have demonstrated in many other sensory tests average or greater sensory acuity. Two tasters tasted two separate batches of enhancer fortified coffee (1 ml enhancer per 200 ml coffee) against untreated controls (no enhancer added) replicated four times. The taster was asked to complete a ballot containing the query: "Judge the intensity of good coffee flavor aroma on the scale from 0–10. A mark on a 10 cm line between "0" and "10" recorded the tasters perception of the magnitude of the good coffee aroma.

Figure 3:
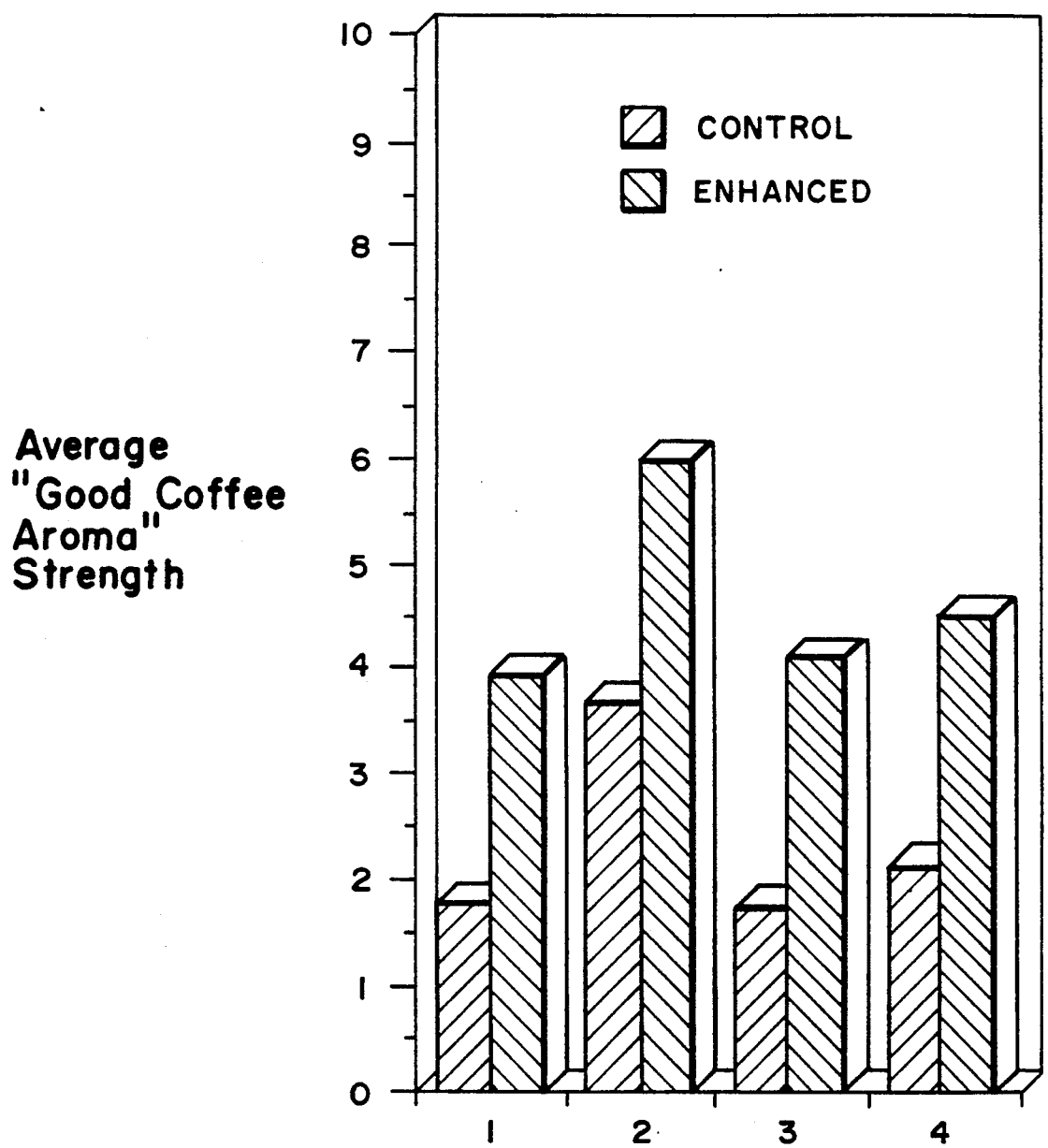
FIG. 3 is a bar graph showing test panel results comparing average "Good Coffee Aroma Strength" for reconstituted instant coffee with and without added coffee flavor enhancers.

Results of the sensory test comparing the effects of the enhancer on the perception of good coffee aroma are tabulated in Table 1 and are shown graphically in FIG. 3. Using variance analysis the F-values were expressed as percent probability of enhanced good coffee aroma.

TABLE 1

| BATCH | TASTER | REP. | SCORE CONTROL | SCORE ENHANCED | % PROBABILITY OF ENHANCEMENT |
|---|---|---|---|---|---|
| 1 | 1 | 1 | 1.6 | 4.5 | |
| 1 | 1 | 2 | 2.1 | 5.1 | |
| 1 | 1 | 3 | 2.3 | 3.5 | |
| 1 | 1 | 4 | 1.0 | 2.6 | 98 |
| 1 | 2 | 1 | 3.8 | 6.9 | |
| 1 | 2 | 2 | 2.5 | 5.1 | |
| 1 | 2 | 3 | 3.5 | 5.0 | |
| 1 | 2 | 4 | 4.9 | 6.8 | 99 |
| 2 | 1 | 1 | 1.4 | 3.8 | |
| 2 | 1 | 2 | 0.8 | 5.7 | |
| 2 | 1 | 3 | 3.9 | 0.4 | |
| 2 | 1 | 4 | 0.8 | 6.4 | 70 |
| 2 | 2 | 1 | 2.0 | 7.3 | |
| 2 | 2 | 2 | 2.0 | 4.2 | |
| 2 | 2 | 3 | 2.0 | 4.0 | |
| 2 | 2 | 4 | 2.4 | 2.4 | 98 |

It is seen from the Sensory test evaluation that three out of the four taste panelists rated the flavor enhanced coffee superior to the control coffee.

What is claimed is:

1. A process for preparing a coffee flavor enhancer having odor and taste characteristics of freshly ground or freshly brewed coffee which comprises:
    a) passing an inert gas through ground, roasted coffee at a temperature from about 150° F. to about 190° F. sufficient to entrain the coffee flavor enhancer and other volatiles in said inert gas;
    b) removing the said enhancer from the inert gas stream by selective adsorption on a solid adsorbent adapted to adsorb the desired flavor enhancer while allowing the less desirable coffee derived odors present in the inert gas stream to pass without being adsorbed on said adsorbent; wherein said selective adsorbent is a polymer having a siloxane (Si-O-Si) structure in at least a portion of the polymer backbone and having $C_{12}$ to $C_{24}$ hydrophobic alkyl or alkenyl hydrocarbyl appendages or $C_{12}$ to $C_{24}$ hydrophobic alkoxy appendages pendant to said backbone and said adsorption is effected in the presence of a stabilizing amount of an antioxidant 2. The process of claim 1 wherein the solid adsorbent is an octadecylsilane substituted silica.

3. The process of claim 1 wherein the solid adsorbent is a $C_{18}$-silica polymer.

4. The process of claim 3 further comprising the step of isolating the stabilized coffee flavor enhancer as a solution in a food grade acceptable solvent or solvent/water mixture.

5. The process of claim 4 wherein the food grade solvent is an ethanol/water mixture.

6. The process of claim 4 wherein the food grade solvent is a glycol/water mixture.

7. A composition comprising a coffee flavor enhancer prepared according to claim 5 and a carrier, including both liquid and solid carriers, wherein said composition can be stored under ambient conditions without detriment to the flavor enhancer aroma and taste characteristics and from which the flavor enhancer can be used to produce reconstituted coffee having the characteristics of freshly brewed of freshly roasted coffee.

* * * * *